US012686489B2

(12) United States Patent
Muller et al.

(10) Patent No.: US 12,686,489 B2
(45) Date of Patent: Jul. 21, 2026

(54) FLIGHT CONTROL SYSTEM FOR AIRCRAFT WITH AUTOPILOT

(71) Applicant: Airbus Operations (S.A.S.), Toulouse (FR)

(72) Inventors: Jean Muller, Toulouse (FR); Sylvain Billes, Toulouse (FR)

(73) Assignee: Airbus Operations (S.A.S.), Toulouse (FR)

( * ) Notice: Subject to any disclaimer, the term of this patent is extended or adjusted under 35 U.S.C. 154(b) by 0 days.

(21) Appl. No.: 19/095,308

(22) Filed: Mar. 31, 2025

(65) Prior Publication Data

US 2025/0313332 A1      Oct. 9, 2025

(30) Foreign Application Priority Data

Apr. 4, 2024     (FR) ................................. FR2403465

(51) Int. Cl.
*B64C 13/18*          (2006.01)
*B64C 13/50*          (2006.01)

(52) U.S. Cl.
CPC ............. *B64C 13/18* (2013.01); *B64C 13/505* (2018.01)

(58) Field of Classification Search
CPC ........ B64C 13/505; B64C 13/18; G05D 1/80; G06F 11/07; G06F 15/16
See application file for complete search history.

(56) References Cited

U.S. PATENT DOCUMENTS

2018/0180444 A1*   6/2018   Cantaloube ........... G06F 3/0488

FOREIGN PATENT DOCUMENTS

FR          3061344  A1      6/2018

OTHER PUBLICATIONS

French Search Report and Written Opnion for FR Application No. 2403465, dated Sep. 25, 2024, 7 pages.

* cited by examiner

*Primary Examiner* — Tye William Abell
(74) *Attorney, Agent, or Firm* — KDW Firm PLLC

(57)          ABSTRACT

A flight control system for an aircraft including a first set of primary flight control computers and a second set of secondary flight control computers, where each primary flight control computer implements a first autopilot functionality. The secondary flight control computers jointly take control of control surface actuators when the primary flight control computers fail. The flight control system further includes another computer, to which the secondary flight control computers are connected, which implements a simplified second autopilot functionality, the second autopilot functionality being able to be activated only when the second set of flight control computers has control of the control surface actuators. Thus, an autopilot functionality is widely available, while at the same time ensuring the robustness sought by the installation of the secondary flight control computers.

9 Claims, 3 Drawing Sheets

Fig. 4

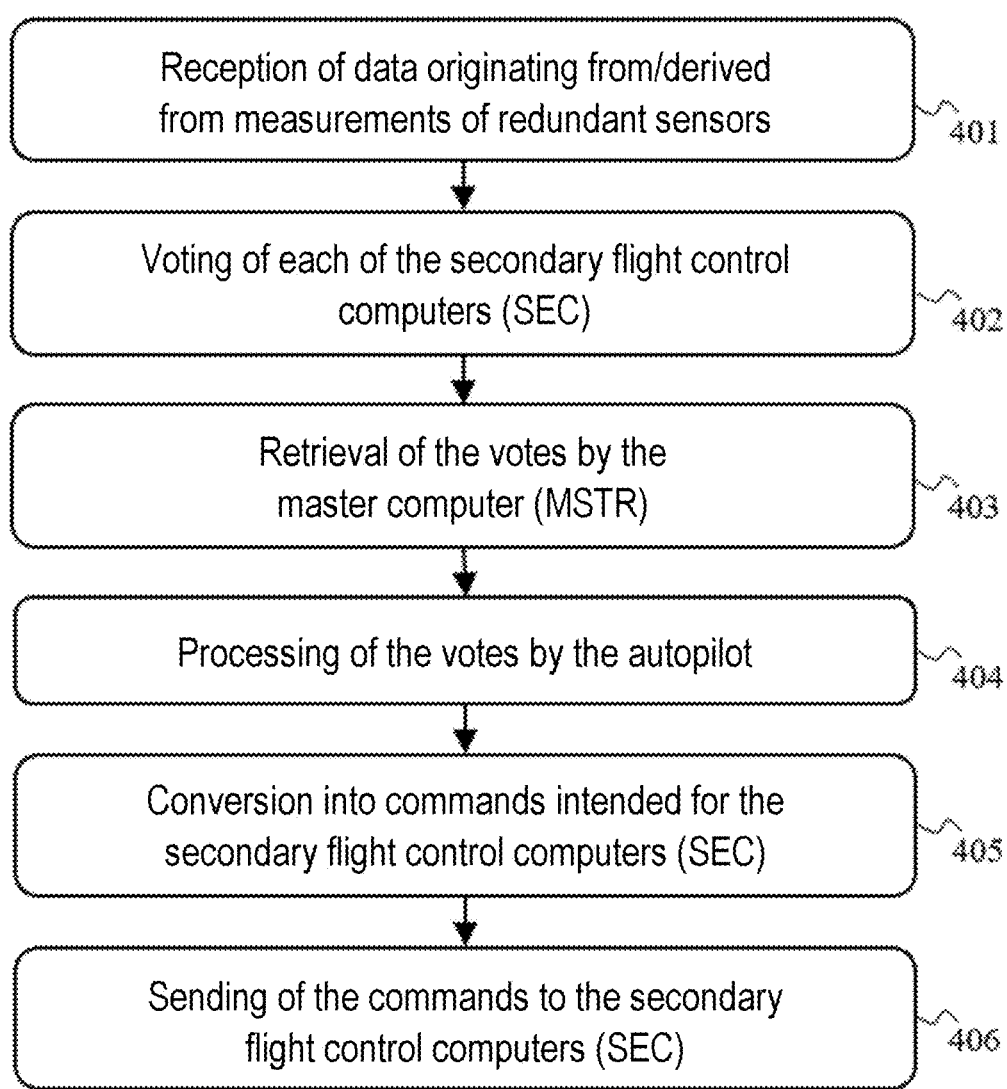

Reception of data originating from/derived from measurements of redundant sensors    401

Voting of each of the secondary flight control computers (SEC)    402

Retrieval of the votes by the master computer (MSTR)    403

Processing of the votes by the autopilot    404

Conversion into commands intended for the secondary flight control computers (SEC)    405

Sending of the commands to the secondary flight control computers (SEC)    406

Fig. 5

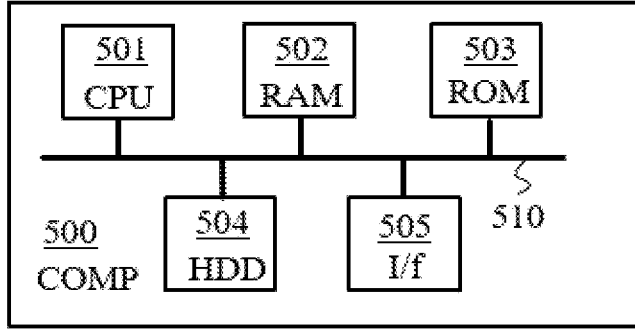

501 CPU
502 RAM
503 ROM
500 COMP
504 HDD
505 I/f
510

FLIGHT CONTROL SYSTEM FOR AIRCRAFT WITH AUTOPILOT

TECHNICAL FIELD

The disclosure herein relates to flight control systems for aircraft. More particularly, the disclosure herein relates to the implementation of an autopilot functionality in aircraft.

BACKGROUND

Many aircraft are equipped with an autopilot functionality. This functionality is implemented in a flight control computer system FCC.

Conventionally, the flight control computer system FCC of an aircraft comprises a first set of flight control computers FCC, referred to as primary (PRIM), and a second set of flight control computers FCC, referred to as secondary (SEC). For reasons of operational robustness, the first set of flight control computers FCC therefore comprises a plurality of primary flight control computers FCC (3, for example) and the second set of flight control computers FCC comprises a plurality of secondary flight control computers FCC (3 also, for example).

In nominal operating mode, the flight of the aircraft is controlled by a primary flight control computer FCC according to a flight control law called the "normal law". The primary flight control computers FCC are identical. If the primary flight control computer FCC in use fails, control of flight of the aircraft is transferred to another primary flight control computer FCC, and so on. Each of the primary flight control computers FCC thus takes, in turn, that is to say mutually exclusively, control of the control surface actuators of the aircraft depending on possible operating failures among the first set of flight control computers FCC.

If all the primary flight control computers FCC fail successively, control of flight of the aircraft is transferred to the secondary flight control computers FCC. The secondary flight control computers FCC are identical, and for the sake of increased robustness, implement flight control functionalities which are simplified with respect to the primary flight control computers FCC. The flight of the aircraft is thus controlled according to a flight control law called the "direct law", which controls the flight of the aircraft directly according to the maneuvers of the pilot using the side-stick (namely, electric flight controls for steering along the roll and pitch axes). Unlike the primary flight control computers FCC, the secondary flight control computers FCC are used jointly (simultaneously) to control the flight of the aircraft. Each controls its own subset of the control surface actuators of the aircraft. The control of the control surface actuators of the aircraft is thus distributed between the secondary flight control computers FCC, and the secondary flight control computers FCC do not communicate with one another and are therefore not synchronized with each other, in order to avoid possible conflicts concerning the control of the control surface actuators.

FIG. 1 schematically illustrates a flight control computer system FCC 100 of an aircraft, as presented above. FIG. 1 therefore shows the first set of flight control computers FCC 110, here consisting of 3 primary flight control computers FCC PRIM_1 110a, PRIM_2 110b, PRIM_3 110c. FIG. 1 also shows the second set of flight control computers FCC 120, here consisting of 3 secondary FCC flight control computers FCC SEC_1 120a, SEC_2 120b, SEC_3 120c. As explained above, the flight control computer system FCC 100 controls a set of control surface actuators ACT 130.

When flight control is transferred to the second set of flight control computers FCC 120, a first subset of control surface actuators ACT_1 130a is controlled by the secondary flight control computer FCC SEC_1 120a, a second subset of control surface actuators ACT_2 130b is controlled by the secondary flight control computer FCC SEC_2 120b and a third subset of control surface actuators ACT_3 130c is controlled by the secondary flight control computer FCC SEC_3 120c.

As schematically illustrated in FIG. 1, each of the primary flight control computers FCC PRIM_1 110a, PRIM_2 110b, PRIM_3 110c implements an autopilot functionality AP 111 identically. And, since the secondary flight control computers FCC (SEC) implement functionalities which are simplified with respect to the primary flight control computers FCC (PRIM), the secondary flight control computers FCC do not implement autopilot functionality. Thus, when flight of the aircraft is controlled by the second set of flight control computers FCC, the autopilot functionality is no longer available.

It is therefore desirable to provide a solution which makes it possible to benefit more widely from the autopilot functionality, without, however, impairing the robustness sought by the installation of the secondary flight control computers FCC. It is notably important that control of the control surface actuators of the aircraft remains distributed among the secondary flight control computers FCC when flight control is transferred to the second set of flight control computers FCC.

SUMMARY

Disclosed herein is a flight control system for an aircraft, comprising a first set of flight control computers referred to as primary and a second set of flight control computers referred to as secondary, the secondary flight control computers implementing flight control functionalities which are simplified with respect to the primary flight control computers, the primary flight control computers being configured to control the control surface actuators mutually exclusively depending on possible failures of one and/or other of the primary flight control computers, each primary flight control computer implementing a first autopilot functionality, the flight control system being configured so that the second set of flight control computers takes control of the control surface actuators when the primary flight control computers fail, the secondary flight control computers jointly controlling the control surface actuators and each secondary flight control computer being configured to control its own subset of the control surface actuators. The flight control system further comprises another computer, referred to as the master computer, to which the secondary flight control computers are connected, implementing a second autopilot functionality which is simplified with respect to the first autopilot functionality, the second autopilot functionality being able to be activated only when the second set of flight control computers has control of the control surface actuators.

Thus, by virtue of the arrangement by the master computer, an autopilot functionality is able to be activated although the control surface actuators are controlled by the secondary flight control computers, while at the same time ensuring the robustness sought by the installation of the secondary flight control computers.

According to an embodiment, the second autopilot functionality is able to be activated when the aircraft is in flight.

According to an embodiment, the second functionality is limited to:

controlling the vertical speed of the aircraft, by the elevators; and leveling, by the spoilers, the ailerons and the rudder of the aircraft.

According to an embodiment, the other computer is electronic circuitry integrated into a flight control data concentrator.

In an embodiment, the flight control system is further configured, when the second set of flight control computers has control of the control surface actuators, so that:

the secondary flight control computers receive data originating from and/or derived from measurements of redundant sensors of the aircraft;

each secondary flight control computer votes on the data originating from and/or derived from the measurements of redundant sensors;

the master computer collects the votes of the secondary flight control computers and the second autopilot functionality processes the votes in order to ensure autopilot constraints; and the master computer transmits, to the secondary flight control computers, control commands for the control surface actuators as a consequence of the processing.

Also proposed here is an aircraft comprising a flight control system according to any one of the embodiments presented above.

BRIEF DESCRIPTION OF THE DRAWINGS

The aforementioned features of the disclosure herein, and others, will become more clearly apparent on reading the following description of at least one example of an embodiment, the description being given with reference to the appended drawings, in which:

FIG. 4 schematically illustrates a flowchart of a method for processing data originating from and/or derived from sensors of the aircraft by an autopilot, according to an embodiment; and FIG. 5 schematically illustrates one example of a hardware platform, which is adapted to implement computers of the second flight control system as proposed here.

DETAILED DESCRIPTION

Figure 2:
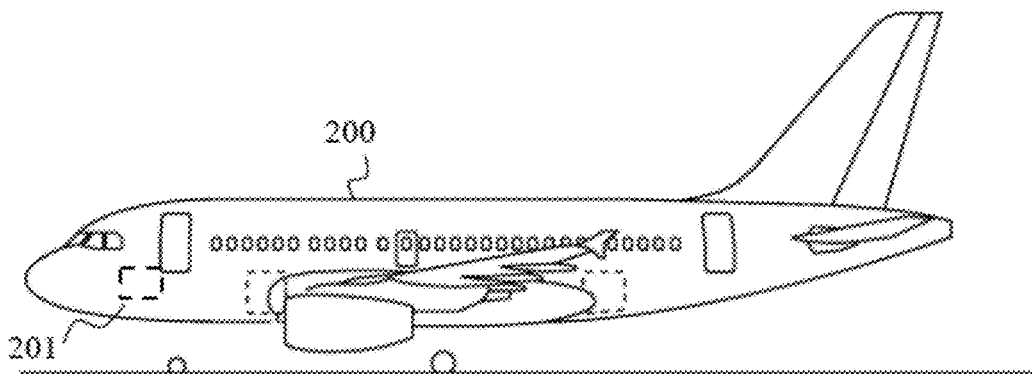
FIG. 2 schematically illustrates a side view of an aircraft equipped with a second flight control system as proposed here.

FIG. 2 schematically illustrates a side view of an aircraft 200 equipped with a flight control system FCC 201 as proposed in the present disclosure.

According to the embodiment of FIG. 2, the flight control system FCC 201 is an electronic device on board the aircraft 200. Preferably, the flight control system FCC 201 forms part of electronic circuitry of the avionics of the aircraft 200.

Figure 3:
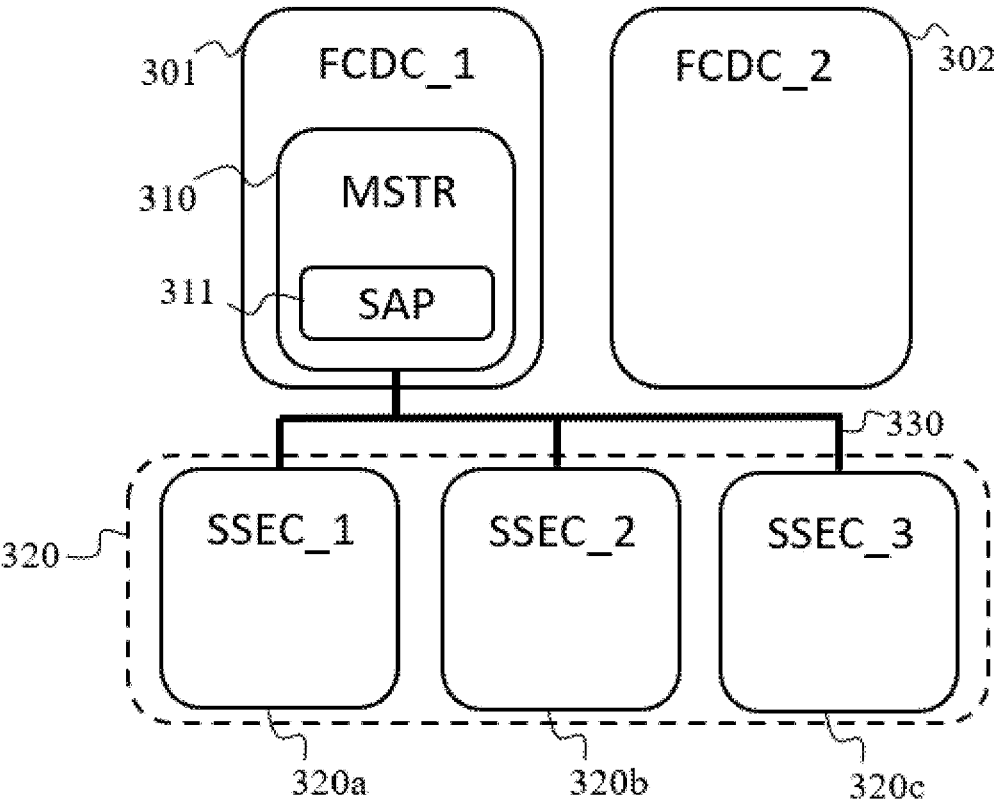
FIG. 3 schematically illustrates an arrangement of the second flight control system as proposed here, according to an embodiment.

FIG. 3 schematically illustrates an arrangement of the flight control system FCC 201, according to an embodiment.

Figure 1:
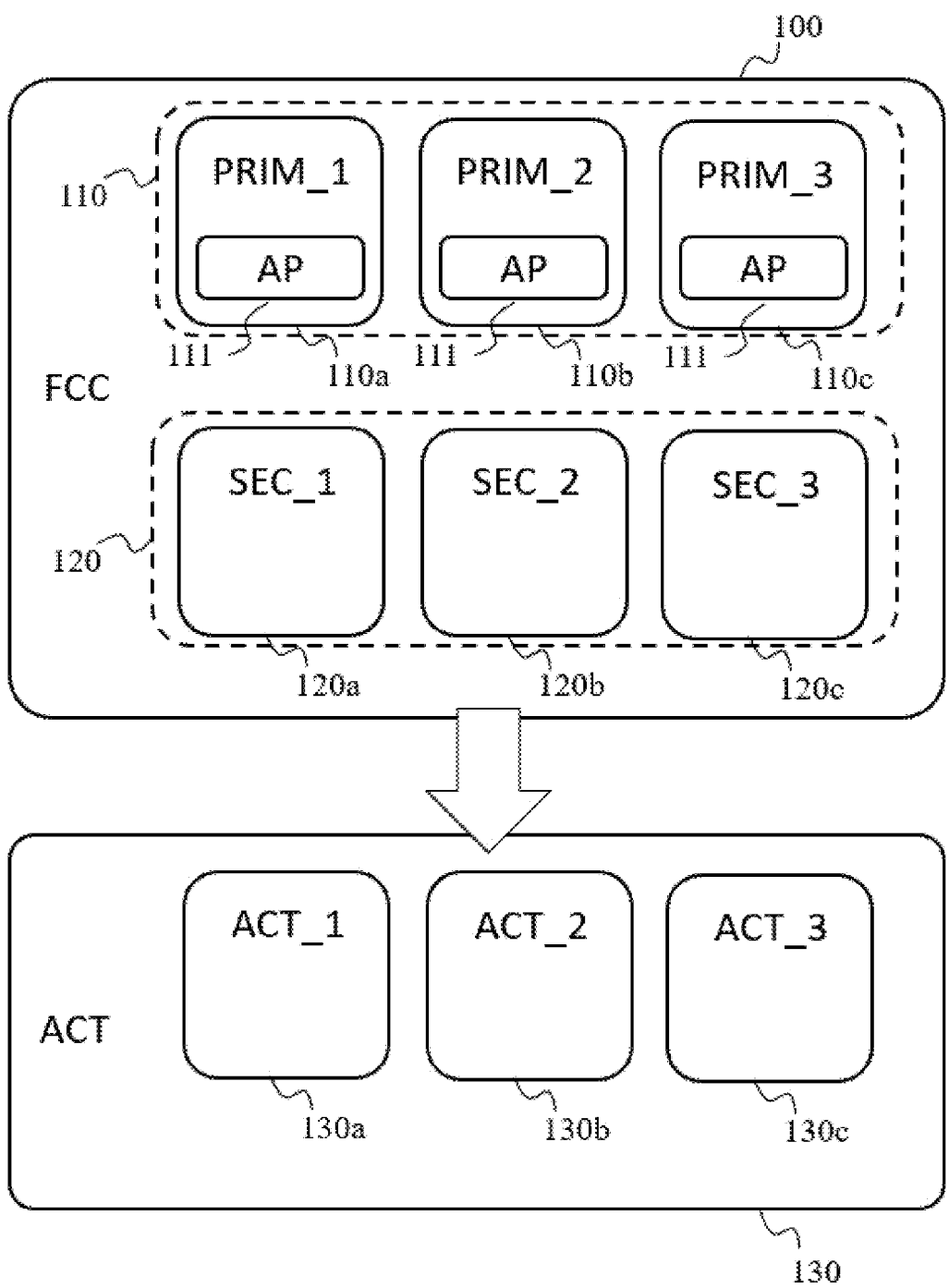
FIG. 1 schematically illustrates an arrangement of the first flight control system, according to the prior art.

The flight control system FCC 201 comprises, as in FIG. 1, the first set of flight control computers FCC 110, referred to as primary (PRIM), for example consisting of 3 primary flight control computers FCC PRIM_1 110a, PRIM_2 110b, PRIM_3 110c. Each of the primary flight control computers FCC PRIM_1 110a, PRIM_2 110b, PRIM_3 110c implements an autopilot functionality AP 111 identically.

The flight control system FCC 201 also comprises a second set of flight control computers FCC 320, secondary flight control computers FCC (SEC) implementing flight control functionalities which are simplified with respect to the primary flight control computers FCC PRIM_1 110a, PRIM_2 110b, PRIM_3 110c. The second set of flight control computers FCC 320 also consists, for example, of 3 secondary flight control computers FCC SSEC_1 320a, SSEC_2 320b, SSEC_3 320c.

As in FIG. 1, the flight control computer system FCC 201 controls the control surface actuator assembly ACT 130. When flight control is transferred to the second set of flight control computers FCC 320, the first subset of control surface actuators ACT_1 130a is controlled by the secondary flight control computer FCC SSEC_1 320a, the second subset of control surface actuators ACT_2 130b is controlled by the secondary flight control computer FCC SSEC_2 320b and the third subset of control surface actuators ACT_3 130c is controlled by the secondary flight control computer FCC SSEC_3 320c.

Each of the secondary flight control computers FCC SSEC_1 320a, SSEC_2 320b, SSEC_3 320c is connected, for example by a communication bus 330, to a computer which is external to the secondary flight control computers FCC SSEC_1 320a, SSEC_2 320b, SSEC_3 320c. This computer, referred as the master computer MSTR 310, implements an autopilot functionality SAP 311 which is simplified with respect to the autopilot functionality AP 111 so as to have increased robustness.

The simplified functionality of autopilot SAP 311 can be activated only when the second set of flight control computers FCC 320 has control of the control surface actuators (failure of the primary flight control computers FCC).

Preferably, the master computer MSTR 310 forms part of electronic circuitry of a flight control data concentrator FCDC. Such a flight control data concentrator FCDC is a device which is already present in modern aircraft, and is used to collect data from sensors and other avionics computers which are useful for flight control. Typically, for the sake of redundancy, modern aircraft have several flight control data concentrators FCDC_1 301, FCDC_2 302. In this case, a single flight control data concentrator FCDC (the flight control data concentrator FCDC_1 301 in FIG. 3) integrates the master computer MSTR 310.

When the autopilot is engaged and flight control has been transferred to the second set of flight control computers FCC 320, the master computer MSTR 310 computes the control commands of the control surface actuators ACT 130 by applying its autopilot functionality SAP 311 and sends these commands to the second set of flight control computers FCC 320, each of the secondary flight control computers FCC SSEC_1 320a, SSEC_2 320b, SSEC_3 320c then controlling the subset of control surface actuators ACT 130 which is assigned to it, depending on these control commands. Thus, the secondary flight control computers FCC SSEC_1 320a, SSEC_2 320b, SSEC_3 320c play the role of slaves, executing the control commands of the control surface actuators ACT 130 computed by the master computer MSTR 310.

Such an arrangement makes it possible to have coherent control of the control surface actuators despite the fact that the secondary flight control computers FCC SSEC_1 320a, SSEC_2 320b, SSEC_3 320c do not communicate with one another and are not synchronized with one another.

In an embodiment, the autopilot functionality SAP 311 can be activated when the aircraft 200 is in flight.

And in an embodiment, the autopilot functionality SAP 311 is limited to:

controlling the vertical speed of the aircraft 200, by the elevators; and leveling, that is to say keeping the bank angle of the aircraft 200 at 0 degrees, by the spoilers, the ailerons and the rudder.

Such an embodiment of the autopilot functionality SAP 311 makes it possible to ensure a comfortable trajectory for passengers, in complete safety when the aircraft is in flight, when flight control has been transferred to the second set of flight control computers FCC 320.

In an embodiment, the robustness of the autopilot functionality SAP 311 can be enhanced by votes taken independently by the secondary flight control computers FCC SSEC_1 320*a*, SSEC_2 320*b*, SSEC_3 320*c* according to data originating from and/or derived from measurements of redundant sensors (such as gyroscopic systems of angular rate system (ARS) type, inertial reference systems (IRS), etc.) of the aircraft 200. This aspect is described below with reference to FIG. 4.

FIG. 4 schematically illustrates a flowchart of a method for processing, by the autopilot functionality SAP 311, data originating from and/or derived from measurements of sensors of the aircraft 200, according to an embodiment.

In a step 401, the secondary flight control computers FCC SSEC_1 320*a*, SSEC_2 320*b*, SSEC_3 320*c* receive data originating from and/or derived from measurements of redundant sensors of the aircraft 200.

In a step 402, the secondary flight control computers FCC SSEC_1 320*a*, SSEC_2 320*b*, SSEC_3 320*c* vote, independently of one another, on the data originating from and/or derived from the measurements of redundant sensors which were received in the step 401.

In a step 403, the votes taken independently by the secondary flight control computers FCC SSEC_1 320*a*, SSEC_2 320*b*, SSEC_3 320*c* are retrieved by the master computer MSTR 310, and provided to the autopilot functionality SAP 311.

In a step 404, the autopilot functionality SAP 311 processes the votes retrieved in the step 403, in order to ensure the autopilot constraints (for example, vertical speed control and leveling), and deduces therefrom results in terms of control of flight of the aircraft 200.

Thus, in a step 405, the autopilot functionality SAP 311 converts the results of the processing of the step 404 into control command(s) of the control surface actuators ACT 130 to be applied by the secondary flight control computers FCC SSEC_1 320*a*, SSEC_2 320*b*, SSEC_3 320*c*.

Then, in a step 406, the autopilot functionality SAP 311 transmits the commands in question to the secondary flight control computers FCC SSEC_1 320*a*, SSEC_2 320*b*, SSEC_3 320*c*.

FIG. 5 schematically illustrates one example of a hardware platform which makes it possible to implement, in the form of electronic circuitry, any computer used in the context of the present disclosure, according to an embodiment.

The hardware platform comprises the following, connected by a communication bus 510: a processor or central processing unit CPU 501; a random-access memory RAM 502; a read-only memory ROM 503, for example an electrically erasable programmable read-only memory (EEPROM) such as a flash memory; a storage unit, such as a hard disk drive HDD 504 or a storage medium reader such as an SD (Secure Digital) card reader; and an interface manager I/f 505.

The interface manager I/f 505 makes it possible for the computer in question to interact with other computers FCC 201 of the flight control system and/or other computers of the avionics of the aircraft 200 and/or sensors of the aircraft 200 and/or control surface actuators of the aircraft 200. Inputs/outputs, a communication network or a communication bus may be used to do this.

The processor 501 is capable of executing instructions loaded into the random-access memory 502 from the read-only memory 503, from an external memory, from a storage medium (such as an SD card), or from a communication network. When the hardware platform is powered up, the processor 501 is capable of reading instructions from the random-access memory 502 and of executing them. These instructions form a computer program causing the processor 501 to implement all or some of the steps or methods or more broadly the behaviors described in the present disclosure.

All or some of the steps, methods and behaviors described here can thus be implemented in software form by executing a set of instructions by a programmable machine, for example a DSP (digital signal processor) or a microcontroller, or be implemented in hardware form by a machine or a dedicated electronic component (chip) or a dedicated set of electronic components (chipset), for example an FPGA (field-programmable gate array) or ASIC (application-specific integrated circuit) component. The term "computer" must therefore be understood in a broad sense. In general, each computer used here is electronic circuitry adapted and configured to implement all or some of the steps, methods and behaviors described here.

While at least one example embodiment of the invention(s) is disclosed herein, it should be understood that modifications, substitutions, and alternatives may be apparent to one of ordinary skill in the art and can be made without departing from the scope of this disclosure. This disclosure is intended to cover any adaptations or variations of the example embodiment(s). In addition, in this disclosure, the terms "comprise" or "comprising" do not exclude other elements or steps, the terms "a", "an" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A flight control system for an aircraft, comprising:

a first set of primary flight control computers and a second set of secondary flight control computers, the secondary flight control computers implementing flight control functionalities which are simplified with respect to the primary flight control computers, the primary flight control computers being configured to control control surface actuators of the aircraft mutually exclusively depending on possible failures of one or more of the primary flight control computers;

wherein each primary flight control computer is configured to implement a first autopilot functionality, the flight control system being configured so that the secondary flight control computers take control of the control surface actuators in response to a failure of the primary flight control computers;

wherein the secondary flight control computers are configured to jointly control the control surface actuators and each secondary flight control computer is configured to control its own subset of the control surface actuators; and wherein the flight control system further comprises a master computer, to which the secondary flight control computers are connected, configured to implement a second autopilot functionality which is simplified with respect to the first autopilot functionality, the second autopilot functionality being able to be activated only when the secondary flight control computers have control of the control surface actuators.

2. The flight control system of claim 1, the master computer being electronic circuitry integrated into a flight control data concentrator of the aircraft.

3. The flight control system of claim 1, further configured, when the secondary flight control computers have control of the control surface actuators, so that:

the secondary flight control computers receive data originating from and/or derived from measurements of redundant sensors of the aircraft;

each secondary flight control computer votes on the data originating from and/or derived from the measurements of redundant sensors;

the master computer collects the votes of the secondary flight control computers and the second autopilot functionality processes the votes to ensure autopilot constraints; and the master computer transmits, to the secondary flight control computers, control commands for the control surface actuators as a consequence of the processing.

4. The flight control system of claim 1, wherein the secondary flight control computers are configured to take control of the control surface actuators in response to all the primary flight control computers failing.

5. The flight control system of claim 1, wherein the secondary flight control computers are configured to be operated simultaneously to control surface actuators of the aircraft.

6. The flight control system of claim 1, wherein the master computer is external to the second set of secondary flight control computers.

7. The flight control system of claim 1, the second autopilot functionality being able to be activated when the aircraft is in flight.

8. The flight control system of claim 7, the second functionality being limited to:

controlling a vertical speed of the aircraft, by elevators; and leveling, by spoilers, ailerons and a rudder of the aircraft.

9. An aircraft comprising the flight control system of claim 1.

* * * * *